Oct. 9, 1928.  1,686,685
W. E. DUNSTON
AUTOMOBILE BUMPER
Filed Aug. 27, 1923
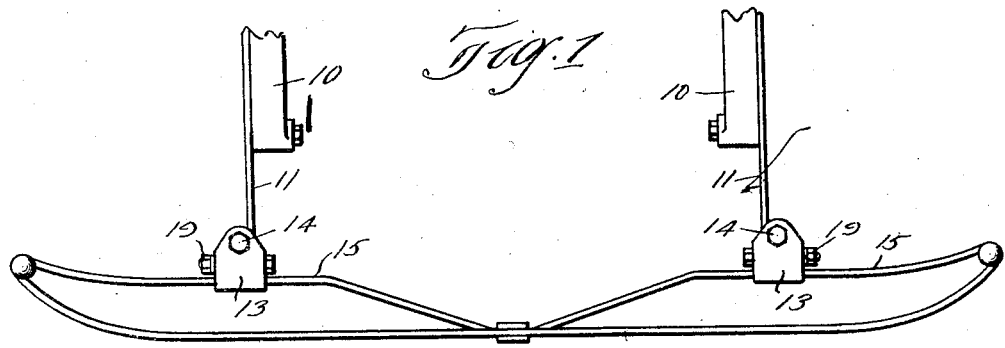
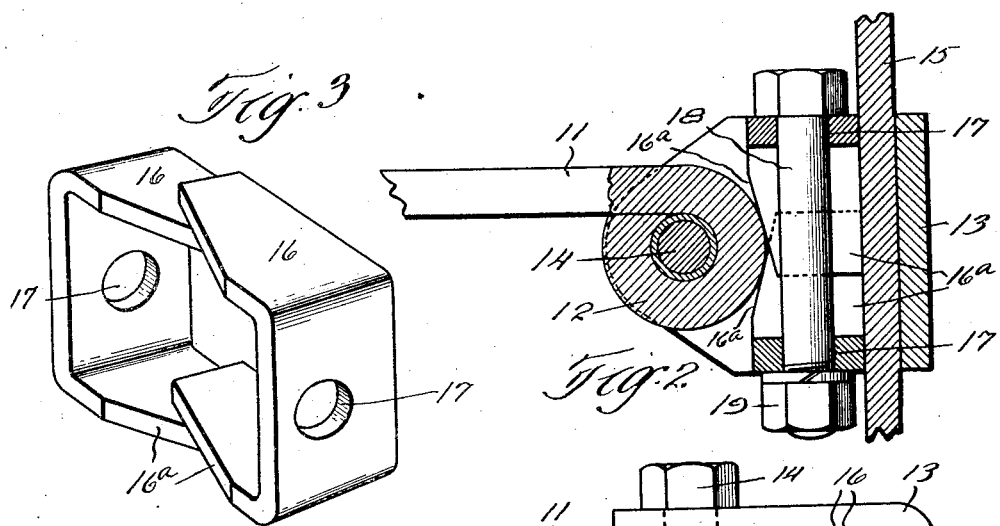
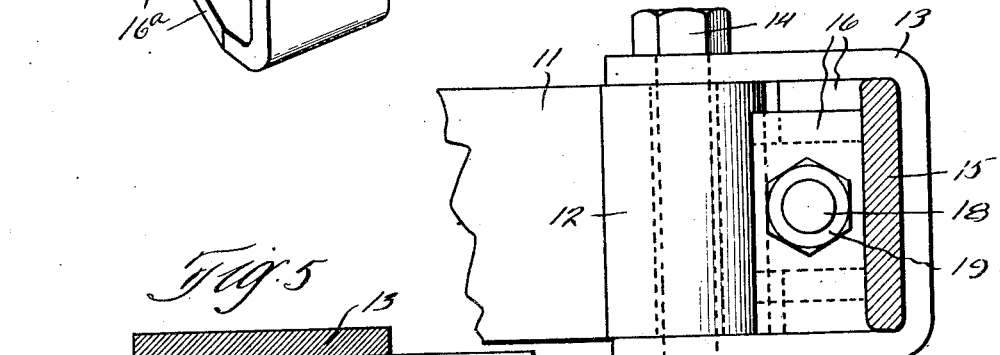
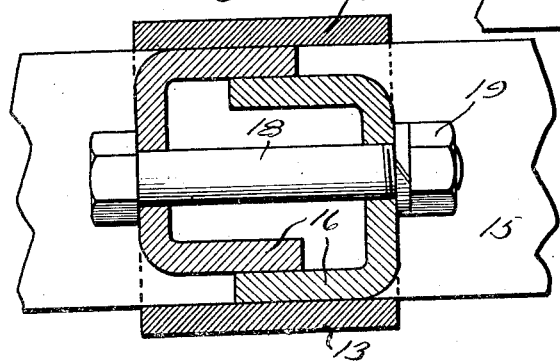
Inventor:
Wayne E. Dunston
By Hull, Brock & West
Attys.

Patented Oct. 9, 1928.

1,686,685

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed August 27, 1923. Serial No. 659,483.

This invention relates generally to automobile bumpers and more particularly to certain improvements in the pivot clamp connection between such bumpers and the supporting arms for the same.

The object of the invention is to provide a simple and easily operated and thoroughly efficient means for fastening the bumper bar in the stirrup carried at the forward end of the supporting arm, and one which can be adjusted and secured after the bumper has been positioned in the stirrup.

Another object is to provide a fastening means of such construction that it can be quickly and easily released, to a limited extent, without removal from the stirrup; to permit the lateral adjustment of the bumper bar with reference to the supporting arm, and a still further object is to provide a wedging means which can be made of stamped sheet metal and in which similar complementary members are employed, thereby reducing the manufacturing cost of the device.

Other objects will appear as the description proceeds.

The invention consists in providing a suitable wedging means within the stirrup, between the bumper bar and the end of the supporting arm, whereby the bumper bar can be locked securely to said stirrup and arm.

The invention consists also in providing two similarly shaped wedge members with openings so positioned that, when the members are arranged within the stirrup and in overlapped engagement with each other, a single clamping bolt can be passed therethrough for the purpose of expanding said wedge members into engagement with the supporting arm and bumper bar arranged in the stirrup.

The invention consists also in certain details of construction and novelties of combination hereinafter fully described and set forth in the appended claims.

In the drawings forming a part of this specification, Fig. 1 is a plan view of a bumper secured by a pivot clamp constructed in accordance with my invention; Fig. 2 is a horizontal sectional view of the stirrup, with the bumper bar therein, as well as the expanding wedges and the bolt for expanding the same; Fig. 3 is a view in perspective showing the manner of arranging the wedge members together; Fig. 4 is an elevation of the end of the supporting arm, stirrup and wedges, the bumper bar being shown in section; and Fig. 5 is a sectional view of the stirrup and wedge members, the bumper bar being shown in elevation.

Referring to the drawings, 10 indicates the frame members of an automobile and 11 the supporting arms rigidly connected to said frame members and projecting forwardly therefrom, each supporting arm terminating in an eye 12 at the forward end. Connected to each supporting arm at the forward end is a stirrup 13 comprising a front member and top and bottom members, said top and bottom members being apertured for the passage of a bolt 14 for the purpose of pivotally connecting the stirrup to the supporting arm; located within the stirrup is the rear or auxiliary bar 15 of the bumper.

This bumper bar contacts with the inner or rear face of the front side of the stirrup and, for the purpose of securely fastening the bumper bar within the stirrup, I employ two similar wedge members 16, preferably of stamped metal, and by making the openings 17 slightly off center, it will be readily seen that, by overlapping the members, as shown in Figs. 3 and 5, the clamping bolt 18 can be passed directly through the wedge members, and by means of a nut 19 said members can be brought together and their wedge faces 16ª riding against the eye of the supporting arm will cause the bumper bar to be securely locked within the stirrup, inasmuch as the straight faces of the wedge members contact with and ride upon the inner face of the bumper bar.

If desired, a block could be interposed between the eye of the supporting arm and the wedge members, but such additional member would not be absolutely necessary, as a full and complete wedge action can be had from the contact between the wedge faces of the member 16 and such eye. By having the wedge members similar and complementary, only one form of stamping will be necessary and it will be immaterial how the members are arranged with reference to each other, as the openings 17 will be brought into alignment when the members are overlapped, inasmuch as the openings are placed off center a distance equal to the thickness of the metal from which the wedges are formed.

In operation the stirrup will be placed upon the bumper bar 15 before said stirrup is attached to the eye of the supporting arm and the wedge members can then be arranged and expanded for the purpose of locking the bumper bar and stirrup together; and should lateral adjustment be desired, it can be readily obtained by loosening up the clamping bolt, permitting the separation of the wedge members, and the bumper bar can then be shifted laterally in either direction, and then, by tightening up the clamping bolt and nut, the wedges are once more securely fastened between the bumper bar and eye of the supporting arm, thereby securely fastening the bumper bar within the stirrup.

By means of the construction herein shown and described a rigid and positive connection is had between the stirrup, bumper bar and forward end of the supporting arm.

Having thus described my invention, what I claim is:—

1. The combination, with a support terminating in an eye, of a stirrup connected thereto, a bumper bar arranged within the stirrup, and complementary wedge members arranged within the stirrup and adapted to engage the bumper bar and eye, together with means for moving said wedge members.

2. The combination, with a support terminating in an eye, of a stirrup connected thereto, a bumper bar arranged within the stirrup, and complementary wedge members arranged within the stirrup in overlapping engagement with each other, together with means for bringing said members together and wedging them between the eye and the bumper bar.

3. In a clamp for clamping a bar to a support, the combination with a continuous stirrup adapted to bear at its end portions upon the edges of the support, of a wedge adapted to bear upon the bar and the support, and means for actuating said wedge.

4. In a clamp for clamping a bar to a support, the combination with a continuous stirrup adapted to bear at its end portions upon the edges of the support, of a wedge adapted to bear upon the bar and the support, and means for actuating said wedge, said means including a bolt passing through said wedge.

5. In a clamp for clamping a bar to a support, the combination with a continuous stirrup adapted to bear at its end portions upon the edges of the support, of a pair of oppositely directed wedges adapted to bear upon the bar and the support, and clamping means for drawing said wedges toward each other.

6. A pivot clamp for clamping a bar to a support, said clamp including a stirrup pivotally connected at its end portions to the support and adapted to bear upon the edges of the same, a wedge adapted to bear upon the support and the bar, and means separate from said stirrup for actuating said wedge.

7. A pivot clamp for clamping a bar to a support, said clamp including a stirrup pivotally connected at its end portions to the support and adapted to bear upon the edges of the same, a pair of oppositely directed wedges adapted to bear upon the support and the bar, and clamping means for drawing said wedges toward each other.

8. The combination with a bumper bar and a support arm for said bar, of a clamp plate adapted to bear upon the outer surface of said bar and be attached to said support, a substantially U-shaped wedge adapted to extend between and bear upon the bar and the support arm, and means for actuating said wedge.

9. The combination with a bumper bar and a support therefor, of a plate adapted to bear upon the outer surface of the bumper bar and to be attached at its inner end portions to said support, a pair of oppositely disposed wedge members adapted to extend between and bear upon the support and bumper bar, and means for drawing said wedge members toward each other.

10. The combination with a bumper bar and a support therefor terminating in an eye, of a stirrup pivotally connected to said eye and adapted to embrace a portion of said bar, a pair of oppositely disposed wedge members having inclined surfaces adapted to bear upon said eye, and means for drawing said wedge members together.

11. The combination with a bumper bar and a support therefor, of a plate adapted to bear upon the outer surface of the said bar and to be connected at its inner end portions to the support, a pair of oppositely directed substantially U-shaped wedge members adapted to pass between and bear upon the support arm and the said bar, and means for drawing said wedge members toward each other.

12. The combination with a bumper bar and a support therefor, of a plate adapted to bear upon the outer surface of the said bar and to be pivotally connected at its inner end portions to the said support, a pair of oppositely directed substantially U-shaped wedge members, each having an inclined surface adapted to bear upon the end portion of said support, and means for drawing said wedge members toward each other.

13. The combination with a bumper bar and a support therefor, of a plate adapted to embrace a portion of the bumper bar and to be connected at its inner end portions to said support, a wedge member adapted to separate the support from the bumper bar, and means, passing through said wedge member, for actuating the same.

14. The combination with a bumper bar and a support therefor, of a clamp having inner end portions clamped against the end portion of the support and having outer end portions partially enclosing the said bumper bar, a wedge between said bar and said support, and means separate from said clamp for actuating said wedge.

In testimony whereof, I hereunto affix my signature.

WAYNE E. DUNSTON.